Figure 1:
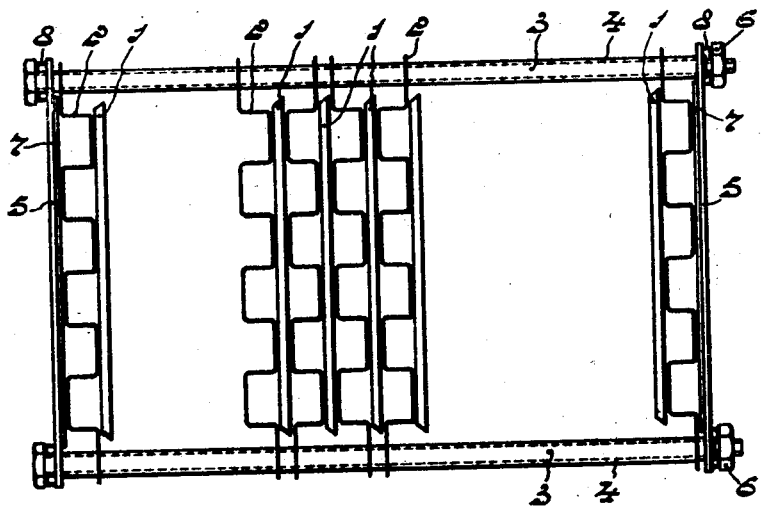

INVENTORS
PIETER HARM FENNEMA
ALBERTUS JACOBUS v. d. HOOGENHOFF
ATTORNEY

Patented Nov. 29, 1949

2,489,767

UNITED STATES PATENT OFFICE 2,489,767

RECTIFIER

Pieter Harm Fennema and Albertus Jacobus van den Hoogenhoff, Eindhoven, Netherlands, assignors to Hartford National Bank and Trust Company, Hartford, Conn., as trustee Application June 24, 1947, Serial No. 756,714
In the Netherlands May 1, 1946

Section 1, Public Law 690, August 8, 1946
Patent expires May 1, 1966

3 Claims. (Cl. 175—366)

It is known to combine a number of rectifying cells, for example selenium cells, to form a battery by arranging them in parallel and with some spacing. In this case the cells, each of which exhibits a central aperture, may be slipped on a common central rod with the use of spacers and be kept together by pressure exerted on the ends of the stack thus obtained. The spacing of the cells ensured by the spacers which are also slipped on the central bolt permits circulation of air along the surface of the cells and hence cooling. The cooling effect may still be enhanced by suitable shaping of the spacers so that they fulfill also the function of cooling ribs. Thus, in United States Patents 1,718,663 and 1,738,113 reference is made to spacers constituted by metallic plates which are folded in such manner as to exhibit a rectangular waveform. Swiss Patent Specification 176,472 also describes undulated spacers which in this specification serve also as current collectors. In French Patent Specification 873,390 the rectifying cells have secured to them U-shaped cooling fins which fulfill also the function of spacers. Furthermore, the said cooling fins may serve as a carrier frame for the cells. French Patent Specification 892,321 describes a rectifier in which the cells are in electric contact with one another by means of undulated metallic plates which fulfill also the function of cooling plates. In this case rings which are slipped on a central bolt serve as the spacers.

The present invention relates to a rectifier comprising a number of rectifying cells arranged in parallel and, with the use of spacers, at some distance from one another, which rectifier is greatly superior to the constructions of known type as regards simplicity, cheapness and facility of manufacture and which possesses excellent electrical and mechanical properties.

According to the invention, the non-perforated cells arranged in parallel with the use of spacers are clamped between folded metallic strips, the plane sides of which engage the cells so that the latter are supported by the strips on either side.

The metallic strips fulfill in this case the function of carriers for the rectifier cells, cooling plates, spacers and current collectors, a combination of functions which has never been described hitherto and to which the rectifier according to the invention owes its above-mentioned advantageous properties.

Since the cells are supported by the metallic strips between which they are clamped, for example a central bolt serving as a carrier for the rectifying cells is not provided so that the cells need not be perforated. Since the provision of a hole in a rectifying cell is required to be effected with care in order to avoid short-circuit of the electrodes of the cell through the edge of the hole, the absence of a central bolt means a considerable saving in the cost of manufacture of the rectifying cell. Furthermore, in the absence of a central bolt, a rectifying cell may easily be removed from the stack and, if desired, replaced by another.

The metallic strips may be caused to protrude beyond the edges of the cells and the protruding extremities may be secured to parallel rods. The stack of cells and spacers is clamped between terminal plates to which the rods are secured. The stack of cells and metallic strips is kept together by pressure exerted on the terminal plates, which pressure is obtained, for example, by screwing nuts provided on the parallel rods extending through the terminal plates.

An advantage of the use of parallel tension rods externally of the stack of cells with respect to attachment to a central bolt is furthermore that the edges and angles of the rectifying cells are less liable to be damaged since they are somewhat shielded. Another advantage of clamping the cells according to the invention is that the carrier plates for the rectifying cells are not required to be so rigid as with attachment to a central bolt. Since flexion of the plates need not be feared, use may be made of thin carrier plates, for example of 1 mm. thickness, which adds to a small weight of the rectifier. Furthermore use may be made of carrier plates of aluminum, even of the said small thickness, which are generally too flexible for attachment to a central bolt. Aluminum carrier plates are highly suitable, for example, for use with selenium cells, for which the invention is consequently of great importance. In view of a small weight the folded spacers are preferably also of light metal such as aluminium or an aluminium alloy. Since in selenium cells the counter-electrode is, as a rule, of a very soft alloy, the spacers are required to be free from burr or sharp edges to prevent them from cutting into the electrodes of the rectifying cell and deteriorating the blocking layer.

Since the metallic strips serving as spacers for the cells and permitting circulation of a cooling medium along and between the cells exhibit a comparatively large surface and are in contact with the rectifying cells over a large surface, satisfactory exchange of heat between the plates is ensured and the cooling effect still improved. The heat exchange is facilitated by the use of material of good thermal conductivity, such as aluminium. If the width of the strips is considerably smaller than the height or the width of the rectifying cells, the cooling medium can easily circulate between the cells in both the horizontal and vertical directions. Consequently, it is in practice immaterial for the temperature of the rectifier whether the rectifier is positioned horizontally or vertically. This is an advantageous factor for the use of rectifiers according to the invention. On each side of a cell are preferably provided two strips, each of which contacts with the cell over a width of one third at the most of the dimension of the cell transversely of the strips.

If intenser cooling is desired, a few cells are preferably replaced by metallic plates which are therefore clamped between the folded strips in a similar manner as the cells themselves.

Since the metallic strips are in contact with the rectifying cells over a large surface area, satisfactory electric contact is also ensured so that the spacers readily fulfill the function of current collectors for the cells. The electric connection is thus rendered very simple and cheap. Since the pressure at which the cells are clamped between the spacers is divided over a large surface area, there is no danger of detrimental consequences for the blocking layer of a cell. The metallic strips are, of course, required to be secured to the parallel rods in an electrically insulating manner. For this purpose the rods may each comprise an insulating surface. The arrangement of the plates according to the invention is particularly suitable for the connection of a large number of rectifier cells in series.

If the cells are arranged with their carrier plate directed alternately to the left and to the right, the construction according to the invention also permits parallel connection of a large number of cells to be obtained in a very simple manner.

If definite groups of cells are desired to be insulated from one another, it is possible to provide an insulating plate, for example, between two adjacent cells, which plate is clamped in a similar manner as a rectifying cell between the metallic strips which, in their turn, serve to clamp the cells to be insulated. Consequently, in the stack of cells and spacers, one cell is so-to-say replaced by an insulating plate. The current supply wires for the cells of the various groups may be secured to the metallic strips, for example, by a soldering operation.

Figure 2:
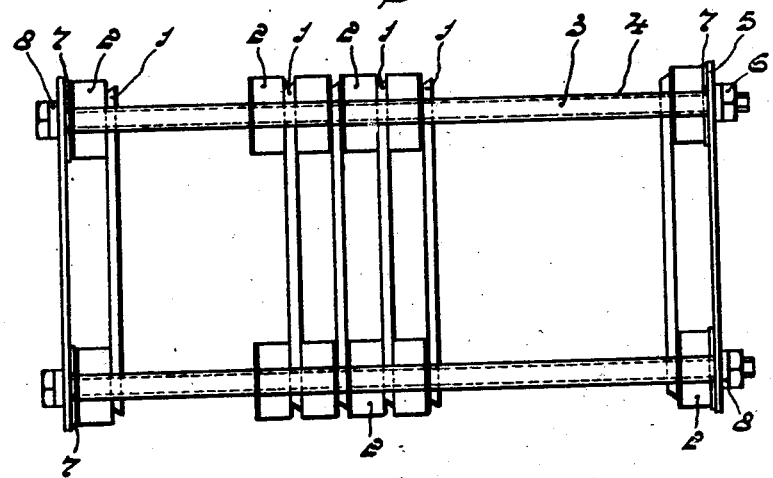

The invention will now be explained more fully by reference to the accompanying drawing, in which Figs. 1 and 2 show a rectifier in plan and in side-view respectively.

Reference numeral 1 indicates the rectifying cells comprising two layers having different capacities of emitting electrons, which are separated by a blocking layer and provided on a carrier plate, for example of aluminium. The various layers are not shown. The cells are clamped between rectangularly undulated strips 2, which are secured to parallel tension rods 3 each exhibiting an insulating coating 4. The rods are secured to the rigid terminal plates 5 by means of nuts 6 which are screwed to such an extent that the stack of cells and metallic strips is rigidly clamped. An insulating plate 7 is provided between the last spacer and the terminal plates. Rings 8 of elastic material permit a small variation in length of the stack under the action of temperature variations. The whole of the rectifier is coated, after assembling, with a lacquer layer, for example by dipping in lacquer.

What we claim is:

1. A rectifier assembly comprising a plurality of unperforated rectifier elements, a plurality of corrugated metallic strips disposed and arranged to securely clamp said rectifier elements therebetween, said corrugated metal strips being provided with plane surface portions to support said rectifier elements between respective pairs of said metallic strips, and clamping means for rigidly securing said rectifier elements between said metal strips.

2. A rectifying assembly comprising a plurality of unperforated rectifying elements, a plurality of corrugated metallic strips disposed and arranged to securely clamp said rectifier elements between respective pairs of said corrugated metallic strips, said strips being provided with plane surface portions to support the rectifier elements between the respective pairs of said strips, the width of said plane portions in a direction transverse to the axis of the strip being less than one-third the width of the rectifier element in the same direction, and clamping means for rigidly securing said rectifier elements between said metal strips.

3. A rectifying assembly comprising a plurality of unperforated rectifier elements, a plurality of metallic cooling plates disposed and arranged between said rectifier elements, a plurality of corrugated metallic strips disposed and arranged to securely clamp said rectifier elements and said interposed cooling plates between respective pairs of said corrugated metal strips, said corrugated metal strips being provided with plane surface portions to support said rectifier elements between respective pairs of said metallic strips, and clamping means for rigidly securing said rectifier elements and said cooling plates between said metal strips.

PIETER HARM FENNEMA.
ALBERTUS JACOBUS VAN DEN
                      HOOGENHOFF.

REFERENCES CITED

The following references are of record in the file of this patent:

UNITED STATES PATENTS

| Number | Name | Date |
| --- | --- | --- |
| 2,388,532 | De Lange et al. | Nov. 6, 1945 |
| 2,416,152 | Braun | Feb. 18, 1947 |

FOREIGN PATENTS

| Number | Country | Date |
| --- | --- | --- |
| 758,746 | France | Jan. 22, 1934 |